United States Patent [19]

Martinez et al.

[11] 4,388,821
[45] Jun. 21, 1983

[54] APPARATUS FOR CALIBRATING THE CARBON MONOXIDE EMISSION UNDER IDLING CONDITIONS OF AN INTERNAL COMBUSTION ENGINE PROVIDED WITH A BOSCH L-JETRONIC ELECTRONIC INJECTION APPARATUS

[75] Inventors: Pasquale Martinez; Vittorio Di Nunzio, both of Turin, Italy

[73] Assignee: Fiat Auto S.p.A., Turin, Italy

[21] Appl. No.: 240,355

[22] Filed: Mar. 4, 1981

[30] Foreign Application Priority Data

Mar. 13, 1980 [IT] Italy ............................ 67388 A/80

[51] Int. Cl.$^3$ ........................................ G01M 15/00
[52] U.S. Cl. ...................................... 73/1 R; 73/116
[58] Field of Search ..................... 73/116, 27 R, 1 R; 123/440, 489

[56] References Cited

U.S. PATENT DOCUMENTS 4,194,471  3/1980  Baresel ........................... 123/489 X
4,204,505  5/1980  Kawai et al. ....................... 123/489
4,338,900  7/1982  Dilger et al. ..................... 123/489 X Primary Examiner—Jerry W. Myracle
Attorney, Agent, or Firm—Sughrue, Mion, Zinn, Macpeak and Seas

[57] ABSTRACT

An apparatus for carrying out the calibration of engines having a Bosch L-Jetronic electronic injection apparatus which is provided with an electronic control unit connected to a "lambda" probe inserted in the exhaust pipe for the closed loop control for carburetion includes a circuit for determining the difference between the value of a correction signal when the probe is switched into the circuit and the value of the correction signal when the probe is switched out of the circuit and a display device for providing a visual display of the difference. The circuit for determining the difference in the correction signals includes first and second resistors, a voltage stabilizer, an operational amplifier having first and second inputs, a first potentiometer having its resistive element connected between the battery and ground and its wiper connected by the first resistor to the second input of the operational amplifier, a circuit for connecting the first input of the operational amplifier to the output of the integrator to receive the correction signal and a second potentimeter having its resistive element connected between the output of the voltage stabilizer and ground and its wiper connected by the second resistor to the second input of the operational amplifier.

5 Claims, 1 Drawing Figure

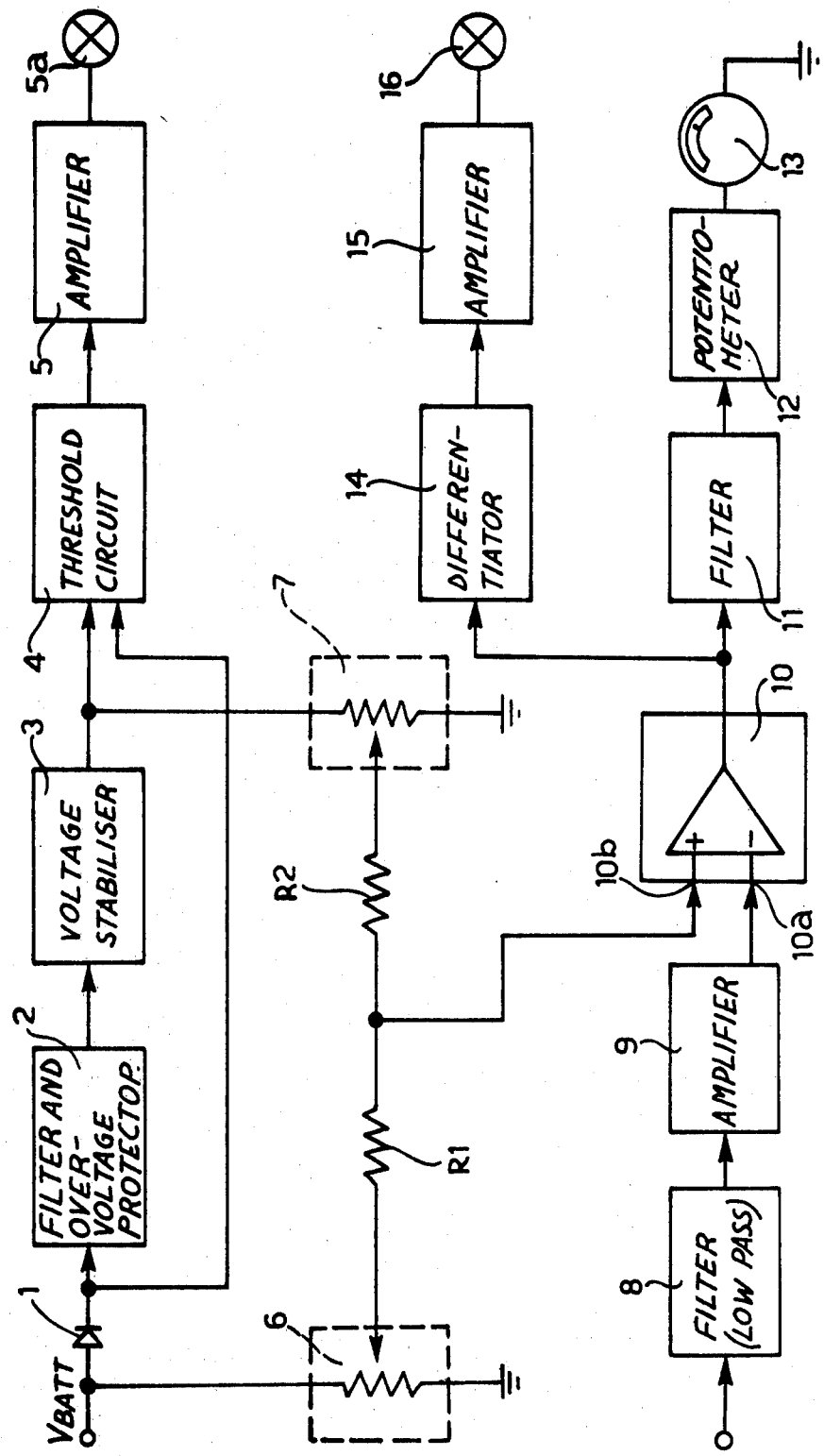

APPARATUS FOR CALIBRATING THE CARBON MONOXIDE EMISSION UNDER IDLING CONDITIONS OF AN INTERNAL COMBUSTION ENGINE PROVIDED WITH A BOSCH L-JETRONIC ELECTRONIC INJECTION APPARATUS

The present invention relates to a method for adjusting the amount of air in the air/petrol mixture to that corresponding to an emission of CO lying between predetermined limits, under idling conditions of an Otto cycle internal combustion engine having petrol injection into the induction manifold with a Bosch L-Jetronic electronic injection apparatus, provided with an electronic control unit comprising means for closed loop control (feedback) of the carburetion by means of a "lambda" probe inserted into the exhaust pipe.

It is known that, in order to comply with the increasingly strict anti-pollution laws to which motor vehicles are subjected, it is necessary to act both on the exhaust system and on the fuel supply system.

For this purpose trivalent monolithic catalytic silencers are used for the exhaust, which silencers act on the emissions of CO, HC, and $NO_x$.

For good operation of these silencers, however, a known requirement is that the mixture strength of the air/petrol mixture be very close to the stoichiometric ratio.

In order to maintain this mixture strength as close as possible to the stoichiometric ratio, an exhaust gas sensor, commonly known as "lambda" probe, is generally used as a feedback in a control system which generates, instant by instant, the correction to be applied to the air/petrol mixture to maintain this mixture strength close to the stoichiometric ratio.

In order to obtain good operation of the system a number of adjustments are normally made at the end of the production line, with the engine operating under idling conditions, which adjustments accurately set the percentage of CO present in the exhaust gas upstream of the catalytic silencer.

At present this is effected by the use of a CO-tester which requires that the vehicle be raised, or located over a pit. All this requires expensive equipment, lengthy operations, and results in a not insignificant cost.

The object of the present invention is that of providing a method which obviates the above-mentioned disadvantages.

The central control unit of the Bosch L-Jetronic system includes an integrator able to generate, in relation to the information coming from the "lambda" sensor, a correction signal, called an "integrator signal", for returning the petrol/air mixture strength to the stoichiometric value, when the departures from this value lie between ±20%.

The applicant has established that, if the integrator acts in the sense such as to determine a weakening of the petrol/air mixture, the output voltage of the integrator tends to fall with respect to the value it has when the feedback control ("lambda" probe) is switched out, while it tends to rise when the integrator acts in the sense of enrichment of the mixture, and that the output voltage of the integrator with the "lambda" probe switched out is substantially constant and the same for all central control units.

The present invention, with a view to obviating the above-mentioned disadvantages of the prior art, provides a method for adjusting the amount of air in the petrol/air mixture, to that which corresponds to an emission of CO lying between predetermined limits, under idling conditions of an Otto cycle internal combustion engine having petrol injection into the induction manifold with Bosch L-Jetronic electronic injection apparatus provided with an electronic control unit including means for closed loop control (feedback) of the carburetion by means of a "lambda" probe inserted in the exhaust pipe, the said control unit including an integrator operable to generate, in dependence on signals coming from the "lambda" probe, the correction voltage signal, called the "integrator signal", to bring the petrol/air mixture strength to the stoichiometric value, characterised by the fact that it comprises the following steps:

(a) establishing a correlation between the variations in the voltage of the integrator signal and the percentage variations of the CO emission;

(b) measuring, while the engine is operating under idling conditions, the deviation of the voltage assumed by the said integrator signal when the "lambda" probe is switched in, with respect to the voltage assumed by this integrator signal when the "lambda" probe is switched out;

(c) acting on the engine's idling air adjustment screw while the "lambda" probe is switched in, in such a way as to bring the above-mentioned voltage deviation into the range which corresponds to an emission of CO lying within the predetermined limits.

It is evident that by measuring the deviation of the voltage of the integrator with the "lambda" probe switched in, with respect to that which it assumes with the "lambda" probe switched out, it is possible to ascertain if the mixture is too rich or too lean so that the idling adjustment screw can be adjusted to vary the petrol/air mixture and bring it to the mixture strength corresponding, upstream of the catalytic silencer, to a value for the precentage of CO which lies within the limits established by the anti-pollution laws, for example, between 0.5 and 0.9.

It has also been verified that the integrator voltage is directly proportional to the voltage of the battery, and therefore the difference between the actual voltage of the integrator and its voltage with the feedback switched off is also directly proportional to the battery voltage. However, it has been verified that, by operating, for example, with a battery voltage between 12 and 14 V (±0.6) (in the case of a battery with a nominal voltage of 12 V), the error which can be made in the adjustment is practically negligible.

The advantage of the method according to the present invention is that of allowing the adjustment of the emission of CO under idling conditions to be made without the necessity of effecting a direct measurement of the CO in the exhaust gases.

The invention also comprehends an instrument for performing the aforesaid method.

Conveniently this instrument is formed in such a say that it provides an indication, by means of a light signal, if the battery voltage is above a predetermined value.

The instrument can be further provided with an illuminable indicator which provides a flashing light indication when the "lambda" probe is switched in.

The invention will now be described in detail by making reference to the attached drawing, provided by way of non-limitative example, which shows a block schematic diagram of a circuit for performing the method according to the invention.

In the drawing, the battery voltage $V_{BATT}$ is supplied to a polarity reversal protection diode 1, connected with a block 2 for filtering and over-voltage protection.

The block 2 is connected with a stabilizer circuit 3, which generates a constant voltage for the integrated circuits and the reference thresholds.

The diode 1 and the stabilizer circuit 3 are connected to a threshold circuit 4 which trips when the battery voltage exceeds a predetermined value (in the present case 12 v±0.6 V).

The threshold circuit 4 is connected to an amplifier circuit 5 connected to a warning lamp 5a the illumination of which indicates that the battery voltage is greater than or equal to 12 V.

The battery voltage is taken to a potentiometer circuit 6 the slider of which is connected, by means of resistors $R_1$, $R_2$ of equal resistance, to the slider of a potentiometer circuit 7 connected to the output of the stabilizer circuit 3. The BOSCH L-Jetronic electronic injection apparatus includes an electronic control unit which provides an integrator signal to the input of a filter 8 connected to an amplifier 9, the output of which is connected to a first input 10a of an operational amplifier 10. The second input 10b of the latter is connected to the common terminal of the resistors $R_1$ and $R_2$.

The operational amplifier 10 is connected to a filter circuit 11 which is connected to a potentiometer 12 connected, in turn, to an indicator instrument 13 constituted, for example, by a moving coil voltmeter.

The output of the operational amplifier 10 is connected to the input of a differentiator circuit 14, the output of which is connected to an amplifier 15 connected, in turn, to an optical indicator 16, constituted, for example, by a lamp.

In operation, the output signal from the operational amplifier 10 is constituted by a voltage signal proportional to the battery voltage (coming from the potentiometer 6 by means of the resistor $R_1$), to which is added a constant voltage signal (coming from the stabilizer circuit 3 by means of the potentiometer 7 and the resistor $R_2$), and from which is subtracted a voltage signal proportional to the voltage of the integrator signal at the input of the filter circuit 8.

The output signal from the operational amplifier 10, as has been indicated above, is supplied to the indicator instrument 13 through the filter 11 and the potentiometer 12.

The device according to the present invention illustrated in the drawing requires, before use, a preliminary calibration which will now be described.

It is convenient, for example, for the central value of the scale of the voltmeter 13 to correspond to the output voltage value from the integrator when the "lambda" probe is switched out. This voltage value will, in the following description, be indicated with $V_{mid}$, and, as is indicated above, this is equal to the voltage which the integrator signal assumes with the "lambda" probe switched in, when the air/petrol mixture strength is equal to the stoichiometric ratio.

The applicant has established that the voltage $V_{mid}$, with the "lambda" probe disconnected, varies in proportion to the battery voltage. In other words, to each value of the battery voltage there is associated a corresponding value $V_{mid}$, and this value $V_{mid}$ is detectable by means of simple measurements.

So that the measurement effected with the instrument illustrated in the drawing will be reliable, it is necessary to calibrate this instrument in such a way that the value $V_{mid}$ is independent of the value of the battery voltage. For this purpose, during calibration, the instrument is supplied with a certain battery voltage value and is provided at the input 10a of the operational amplifier 10 with a voltage the value of which is equal to the value $V_{mid}$ corresponding to this battery voltage, the said value having been previously measured. The operation now described corresponds to a simulation in the calibration phase of the condition with the "lambda" probe disconnected. In this condition the voltage of the output signal from the operational amplifier 10 must be independent of the battery voltage. Because of this, it is necessary that the output voltage from the amplifier 9 be equal to that of the signal coming from the potentiometer 6 through the resistor $R_1$ whatever the battery voltage. This condition can be obtained by acting on the potentiometer 6.

The positioning of the needle of the voltmeter 13 to the centre of the scale is therefore obtainable by acting on the potentiometer 7.

Once the calibration of the instrument has been effected the potentiometer 6 allows the needle of the voltmeter 13 to be taken back to the centre position of the scale in use, allowing possible deviations of the open loop value of the integrator voltage with respect to the nominal value, due to calibration and manufacturing tolerances of the central control box, to be compensated.

In consequence of what has been described above, in use, the needle of the voltmeter 13 will become displaced to the right or to the left with respect to its centre of the scale position upon variation of the output signal from the operational amplifier 10, according to whether the petrol/air mixture is rich or lean.

The needle of the voltmeter 13 will be at the centre of the scale when the strength of the petrol/air mixture is equal to the stoichiometric ratio.

The potentiometer 12 allows the excursions of the output signal from the filter 11 to be adapted to the width of the scale of the indicator instrument 13.

It is possible to mark on the scale of the indicator instrument 13 a range of "acceptability" corresponding to the range of percentage values of emission of CO (for example in the range lying between 0.5% and 0.9%) allowed according to particular anti-pollution laws.

This range of "acceptability" can be defined once and for all on the basis of direct measurements of CO in relation to the deviations of the voltage which the integrator signal undergoes upon variation of the emission of CO, with respect to the condition with the "lambda" probe switched out. The output of the operational amplifier 10 feeds, moreover, a signal to the differentiation circuit 14 which provides a sequence of impulses at the same frequency as the signals provided from the "lambda" probe; these impulses, amplified by the amplifier 15, are then passed to the indicator 16 which, by means of a flashing optical signal, provides the indication that the system is in adjustment.

In use, when the instrument illustrated in the drawing is used for the indirect control of the emission of CO from a motor operating in idling conditions, the following procedure is followed (obviously after having warmed up the engine and after having adjusted its speed to the slowest running setting):

(a) the "lambda" probe is switched out;
(b) by means of the illuminated indicator 5a it is verified if the battery voltage is greater than the pre-established threshold;
(c) the needle of the indicator instrument 13 is positioned to the centre of the scale by acting on the potentiometer 6;
(d) the "lambda" probe is switched in;
(e) it is checked to see if the index of the indicator instrument 13 is located in the above-defined range of "acceptability";
(f) if the index of the indicator instrument 13 is located outside the field of "acceptability", the idling air adjustment screw is turned until the needle of the indicator instrument 13 is carried into the range of "acceptability".

Naturally, the principle of the invention remaining the same, the embodiments and details of construction can be widely varied with respect to what has been described and illustrated purely by way of non limitative example, without by this departing from the scope of the present invention.

What is claimed is:

1. An apparatus for use in adjusting the fuel/air mixture strength under idling conditions of an Otto cycle internal combustion engine having a fuel injection system of the type provided with an electronic control unit including circuit means for the closed loop control of the mixture strength, a sensor responsive to the proportion of carbon monoxide in the exhaust gases located in the exhaust pipe, means for switching said sensor into and out of said circuit means and an integrator operable to generate, in dependence on signals from said sensor, a correction signal representative of the change in the mixture strength required to bring the mixture strength to the stoichiometric value, said adjustment being for the purpose of calibrating said fuel injection system to bring the carbon monoxide emission of the engine under idling conditions to within predetermined limits, said apparatus comprising means for determining the difference between the value of said correction signal when said sensor is switched into the circuit and the value of said correction signal when said sensor is switched out of the circuit including first and second resistors, a voltage stabilizer, an operational amplifier having first and second inputs, a first potentiometer having its resistive element adapted to be connected between a battery and ground and its wiper connected by said first resistor to said second input of said operational amplifier, means connecting said first input of said operational amplifier to the output of said integrator to receive said correction signal, a second potentiometer having its resistive element connected between the output of said voltage stabilizer and ground and its wiper connected by said second resistor to said second input of said operational amplifier and visual display means operating to provide a visual display of said difference.

2. The apparatus of claim 1, further including means for providing an indication that the said sensor is switched in to the circuit and is operating.

3. The apparatus of claim 1, wherein said visual display means include a moving coil voltmeter.

4. The apparatus of claim 1, wherein said means for providing an indication that said sensor is switched in and is working includes:
   a differentiation circuit having an input connected to the output of said operational amplifier;
   a further amplifier;
   means connecting the output of said differentiation circuit to said further amplifier, and
   means connecting the output of said further amplifier to an indicator lamp.

5. The apparatus of claim 1, wherein there is further provided a filter for filtering high frequency components from said correction signal generated by said integrator.

* * * * *